(12) United States Patent
Lee et al.

(10) Patent No.: US 9,163,629 B2
(45) Date of Patent: Oct. 20, 2015

(54) CONTROLLED THICKNESS RESILIENT MATERIAL LINED STATOR AND METHOD OF FORMING

(75) Inventors: Lawrence Lee, Hardwicke (GB); Michael Shepherd, Stroud (GB)

(73) Assignee: Schlumberger Technology Corporation, Sugar Land, TX (US)

(*) Notice: Subject to any disclaimer, the term of this patent is extended or adjusted under 35 U.S.C. 154(b) by 1411 days.

(21) Appl. No.: 12/774,097

(22) Filed: May 5, 2010

(65) Prior Publication Data

US 2011/0271527 A1    Nov. 10, 2011

Related U.S. Application Data

(62) Division of application No. 11/496,562, filed on Jul. 31, 2006, now Pat. No. 7,739,792.

(51) Int. Cl.
    *B23P 15/00* (2006.01)
    *F04C 2/107* (2006.01)
    (Continued)

(52) U.S. Cl.
    CPC ......... *F04C 2/1075* (2013.01); *B29C 45/14614* (2013.01); *B29C 35/02* (2013.01); *B29C 47/0023* (2013.01); *B29C 47/0033* (2013.01); *B29C 47/0038* (2013.01); *B29C 47/0085* (2013.01); *B29C 47/24* (2013.01); *B29C 2035/0827* (2013.01); *B29C 2791/006* (2013.01); *B29C 2791/007* (2013.01); *B29K 2021/006* (2013.01); *B29K 2105/24* (2013.01); *B29K 2105/246* (2013.01); *B29L 2031/7496* (2013.01); *F04C 2230/21* (2013.01); *F04C 2230/24* (2013.01);
    (Continued)

(58) Field of Classification Search
    CPC ......................... F04C 2/1075; Y10T 29/49236
    USPC ......... 29/888.02–888.025, 458, 527.2, 527.3; 418/45, 48; 164/47
    See application file for complete search history.

(56) References Cited

U.S. PATENT DOCUMENTS

| 1,892,217 A | 4/1931 | Moineau |
| 3,084,631 A | 4/1963 | Bourke |

(Continued)

FOREIGN PATENT DOCUMENTS

| DE | 2541779 | 3/1977 |
| DE | 3147663 | 6/1983 |

(Continued)

OTHER PUBLICATIONS

Search Report issued in GB0714553.5 on Dec. 31, 2007, 2 pages.
(Continued)

*Primary Examiner* — David Angwin
*Assistant Examiner* — Kaying Kue
(74) *Attorney, Agent, or Firm* — Kimberly Ballew; Mark D. Shelley, II

(57) ABSTRACT

The present invention relates to a resilient material lined stator and method of forming. A method of forming a resilient material lined stator can include disposing a resilient material tube 400 with a profiled helical inner surface 401 into the bore of a body 420. A cast material 410 can be disposed therebetween. The cast material 410 can bond to the body 420 to form a resilient material lined stator or the body 420 can be removed. The cast material 310 can include a conduit 312 or conductor 314 extending therethrough. The cast material 310 can include a pathway 316 formed therethrough. The resilient material can be an elastomer.

5 Claims, 6 Drawing Sheets

(51) Int. Cl.
  *B29C 45/14*   (2006.01)
  *F01C 5/00*    (2006.01)
  *B29C 35/02*   (2006.01)
  *B29C 47/00*   (2006.01)
  *B29C 47/24*   (2006.01)
  *B29C 35/08*   (2006.01)
  *B29K 21/00*   (2006.01)
  *B29K 105/24*  (2006.01)
  *B29L 31/00*   (2006.01)

(52) U.S. Cl.
  CPC ........ *F04C 2230/27* (2013.01); *Y10T 29/49236* (2015.01)

(56) References Cited

U.S. PATENT DOCUMENTS

| | | | |
|---|---|---|---|
| 3,084,681 A | | 4/1963 | Bourke |
| 3,139,035 A | | 6/1964 | O'Connor |
| 5,171,138 A | * | 12/1992 | Forrest .............. 418/48 |
| 5,171,139 A | * | 12/1992 | Underwood et al. ........... 418/48 |
| 5,832,604 A | * | 11/1998 | Johnson et al. .......... 29/888.023 |
| 6,102,681 A | | 8/2000 | Turner |
| 6,543,132 B1 | | 4/2003 | Krueger et al. |
| 6,568,076 B2 | * | 5/2003 | Bottos et al. ............. 29/888.023 |
| 6,604,921 B1 | * | 8/2003 | Plop et al. ........... 418/48 |
| 6,604,922 B1 | * | 8/2003 | Hache .............. 418/48 |
| 6,881,045 B2 | * | 4/2005 | Zitka et al. ....... 418/48 |
| 7,083,401 B2 | * | 8/2006 | Hooper ........... 418/48 |
| 7,517,202 B2 | * | 4/2009 | Delpassand ........... 418/48 |
| 7,739,792 B2 | * | 6/2010 | Lee et al. ........... 29/888.023 |
| 7,950,914 B2 | * | 5/2011 | Hooper et al. ........... 418/179 |
| 8,257,633 B2 | * | 9/2012 | Sindt et al. ........... 264/299 |
| 8,333,231 B2 | * | 12/2012 | Hooper et al. ........... 164/97 |
| 8,337,182 B2 | * | 12/2012 | Lee et al. ........... 418/48 |
| 8,734,141 B2 | * | 5/2014 | Slay et al. ........... 418/48 |
| 2005/0106004 A1 | | 5/2005 | Jager |
| 2006/0029507 A1 | * | 2/2006 | Kaiser et al. ........... 418/48 |
| 2008/0023863 A1 | | 1/2008 | Lee et al. |
| 2008/0025859 A1 | * | 1/2008 | Lee et al. ........... 418/45 |
| 2008/0264593 A1 | * | 10/2008 | Sindt et al. ........... 164/72 |
| 2008/0304991 A1 | * | 12/2008 | Speckert ........... 418/48 |
| 2008/0304992 A1 | * | 12/2008 | Hooper et al. ........... 418/48 |
| 2009/0169364 A1 | * | 7/2009 | Downton ........... 415/118 |
| 2011/0271527 A1 | * | 11/2011 | Lee et al. ........... 29/888.02 |

FOREIGN PATENT DOCUMENTS

| | | |
|---|---|---|
| DE | 19531319 A1 | 2/1997 |
| FR | 2590328 A1 | 5/1987 |
| GB | 1288284 A | 9/1972 |
| WO | WO 2004/036043 A1 | 4/2004 |

OTHER PUBLICATIONS

Office Action issued in CA2595181 on Jun. 16, 2010, 1 page.
Examination Report issued in GB0714553.5 on Jun. 30, 2010, 3 pages.
Examination Report issued in GB0714553.5 on Dec. 20, 2010, 4 pages.
Examination Report issued in GB0714553.5 on Feb. 23, 2011, 2 pages.

* cited by examiner

CONTROLLED THICKNESS RESILIENT MATERIAL LINED STATOR AND METHOD OF FORMING

REFERENCE TO RELATED APPLICATIONS

This application is a divisional of U.S. patent application Ser. No. 11/496,562 filed Jul. 31, 2006, now U.S. Pat. No. 7,739,792, incorporated herein by reference.

BACKGROUND

The invention relates generally to stators for use with progressive cavity pumps or motors. More specifically, to a resilient material lined stator and a method of forming the stator.

Progressive cavity pumps or motors, also referred to as a progressing cavity pumps or motors, typically include a power section consisting of a rotor with a profiled helical outer surface disposed within a stator with a profiled helical inner surface. The rotor and stator of a progressive cavity apparatus operate according to the Moineau principle, originally disclosed in U.S. Pat. No. 1,892,217.

In use as a pump, relative rotation is provided between the stator and rotor by any means known in the art, and a portion of the profiled helical outer surface of the rotor engages the profiled helical inner surface of the stator to form a sealed chamber or cavity. As the rotor turns eccentrically within the stator, the cavity progresses axially to move any fluid present in the cavity.

In use as a motor, a fluid source is provided to the cavities formed between the rotor and stator. The pressure of the fluid causes the cavity to progress and a relative rotation between the stator and rotor. In this manner fluidic energy can be converted into mechanical energy.

As progressive cavity pumps or motors rely on a seal between the stator and rotor surfaces, one of or both of these surfaces preferably includes a resilient or dimensionally forgiving material. Typically, the resilient material has been a relatively thin layer of elastomer disposed in the interior surface of the stator. A stator with a thin elastomeric layer is typically referred to as thin wall or even wall design.

An elastomeric lined stator with a uniform or even thickness elastomeric layer has previously been disclosed in U.S. Pat. No. 3,084,631 on "Helical Gear Pump with Stator Compression". The prior art has evolved around the principle of injecting an elastomer into a relatively narrow void between a stator body with a profiled helical bore and a core, or mandrel, with a profiled helical outer surface. The core is then removed after curing of the elastomer and the remaining assembly forms the elastomeric lined stator. The elastomer layer is essentially the last component formed.

The stator bodies mentioned above have a pre-formed profiled helical bore. The profiled helical bore is generally manufactured by methods such as rolling, swaging, or spray forming, as described in U.S. Pat. No. 6,543,132 on "Methods of Making Mud Motors", incorporated by reference herein. Similarly, a profiled helical bore can be formed by metal extrusion, as described in U.S. Pat. No. 6,568,076 on "Internally Profiled Stator Tube", incorporated by reference herein. Further, various hot or cold metal forming techniques, such as pilgering, flow forming, or hydraulic forming, as described in P.C.T. Pub. No. WO 2004/036043 A1 on "Stators of a Moineau-Pump", incorporated by reference herein, can be used to form a stator body with a profiled helical bore.

A stator body can also be formed by creating a profiled helical bore in relatively thin metal tubing. This formed metal tube can then be used as the stator body by itself, with an injected inner elastomeric layer, or the formed metal tube can be inserted inside into a second body with a longitudinal bore to form the stator body. A stator body with a profiled helical bore can also be formed through other process such as sintering or hot isostatic pressing of powdered materials, for example, a metal, or the profiled helical bore can be machined directly into a body.

The prior art designs lead to several inherent manufacturing problems when lining the profiled helical bore of the stator with an injected or molded elastomeric layer, for example, rotational and lateral misalignment. Rotational misalignment can occur when the apex of a lobe of a stator and the apex of an adjacent lobe of the core are not substantially aligned relative to a radial line extending from the central axis during the elastomer injection step. The rotational misalignment caused by not appropriately matching the profiles of the core (not shown) and the inner bore of the stator 120 is shown in FIG. 1. The result is a loss of control of the elastomer 100 thickness on both sides of a lobe 102. One side 104 of each lobe has an elastomeric layer thicker than intended and the other side 106 of each lobe has an elastomeric layer thinner than intended.

Another obstacle to forming a desired thickness of an elastomeric layer in a stator is lateral misalignment of the core (not shown) and the stator, shown in FIG. 2. When forming an elastomeric layer 200, there can be lateral misalignment of the profiled helical bore of the stator body 220 and the core (not shown). For example, in a long stator there can be lateral misalignment at the mid section even when the ends of the stator body 220 and the core are aligned properly due to a sagging of the core and/or the stator body 220. Lateral misalignment during the elastomer injection step creates a loss of control of the elastomer 200 thickness in the profiled helical bore, where one side 204 of the bore has an elastomeric layer thicker than intended and the other side 206 of the bore has an elastomeric layer thinner than intended.

One potential solution that has been attempted to solve the lateral alignment problem is the use of radial alignment pins and/or screw plugs passing through the stator body 220 to support the core during the elastomer molding step. However, this typically resulted in another failure mode with fluid leaking through those holes and/or plugs in the stator when used as a progressive cavity apparatus.

It is also desirable to have a conduit, a conductor, and/or a pathway extending through the stator. The conduits, conductors, and/or pathways can be used for communicating in electrical, hydraulic and/or mechanical form between the two ends of the stator. One such implementation is covered in U.S. Pat. No. 5,171,139 on "Moineau Motor With Conduits Through The Stator" which discloses conduits that are embedded within the elastomeric layer of the stator. However, embedding a conduit within the elastomeric layer can limit the size of conduit used when a thin elastomer layer is desired or create other complications.

SUMMARY

In one embodiment of the invention, a method of forming a resilient material lined stator includes providing a tube with a profiled helical resilient material inner surface, disposing the tube within a longitudinal bore of a body, filling a void between an outer surface of the tube and the longitudinal bore of the body with a cast material in a fluid or powder state, and allowing the cast material to solidify. The tube can be a resilient material tube. A method of forming a resilient material lined stator can further include removing an assembly of the cast material and the tube from the longitudinal bore of the body after the step of allowing the cast material to solidify to form the resilient material lined stator. Cast material can be a synthetic and/or natural resin or epoxy. A resin or epoxy can further include fibers, such as polymeric fibers, and/or powders, such as metal powders or ceramic powders. A resin or epoxy can include solids, such as metal or ceramic.

In another embodiment, a method of forming a resilient material lined stator further includes disposing into the void at least one non-stick mandrel extending from a proximal end of the void to a distal end of the void before filling the void with the cast material or the cast material solidifies. The method can further include removing the at least one non-stick mandrel after allowing the cast material to solidify to form a pathway in the cast material.

In yet another embodiment, a method of forming a resilient material lined stator further includes disposing into the void at least one conductor extending from a proximal end of the void to a distal end of the void before filling the void with the cast material or the cast material solidifies.

In another embodiment, method of forming a resilient material lined stator further includes disposing into the void at least one conduit extending from a proximal end of the void to a distal end of the void before filling the void with the cast material or the cast material solidifies.

In yet another embodiment, the step of allowing the cast material to solidify bonds at least a portion of the outer surface of the resilient material tube to the cast material and at least a portion of an inner surface of the longitudinal bore of the body to the cast material.

In another embodiment, a method of forming a resilient material lined stator can include applying a bonding agent to at least one of an inner surface of the longitudinal bore and the outer surface of the tube, which can be a resilient material tube.

In yet another embodiment, a method of forming a resilient material lined stator further includes machining at least one groove into an inner surface of the longitudinal bore to provide a mechanical lock between the cast material and the body.

In another embodiment, a method of forming a resilient material lined stator includes providing a resilient material tube with a profiled helical inner surface, disposing the resilient material tube within a longitudinal bore of a body, filling a void between an outer surface of the resilient material tube and the longitudinal bore of the body with a curable cast material, and curing the cast material.

In yet another embodiment, a method of forming a resilient material lined stator includes providing a resilient material tube with a profiled helical inner surface, disposing the resilient material tube within a longitudinal bore of a body, an axis of the longitudinal bore coaxial with an axis of the resilient material tube, filling a void between an outer surface of the resilient material tube and the longitudinal bore of the body with a cast material in a fluid state, and allowing the cast material to solidify.

In another embodiment, a method of forming a resilient material lined stator includes providing a resilient material tube with an outer surface and a profiled helical inner surface, disposing the resilient material tube within a longitudinal bore of a body, the resilient material tube extending from a distal end of the longitudinal bore of the body to a proximal end of the longitudinal bore of the body, sealing a distal end of a void between the outer surface of the resilient material tube and the longitudinal bore of the body, filling at least a portion of the void with a cast material, and curing the cast material. The method can further include disposing an end ring at the proximal end of the longitudinal bore of the body to center the resilient material tube within the longitudinal bore.

In yet another embodiment, a method of forming a resilient material lined stator includes forming a resilient material tube with a profiled helical inner surface, disposing the resilient material tube within a longitudinal bore of a body, filling a void between an outer surface of the resilient material tube and the longitudinal bore of the body with a cast material in a fluid state, and allowing the cast material to solidify. The resilient material tube can be variable thickness or even thickness.

In another embodiment, the step of forming the resilient material tube with the profiled helical inner surface includes providing a source of an extrudable elastomer, extruding the elastomer through a profile die to form an extrudate, and rotating the profile die relative to the extrudate during extrusion to form the resilient material tube with the profiled helical inner surface.

In yet another embodiment, the step of forming the resilient material tube with the profiled helical inner surface includes providing a source of an extrudable elastomer, and extruding the elastomer through a helical extrusion gap of a hollow die to form the resilient material tube with the profiled helical inner surface and a cylindrical or a profiled helical outer surface.

In another embodiment, the step of forming the resilient material tube with the profiled helical inner surface includes providing or extruding a cylindrical resilient material tube, disposing the cylindrical resilient material tube on a profiled helical core, and twisting the cylindrical resilient material tube onto the profiled helical core to form the profiled helical inner surface.

In yet another embodiment, the step of forming the resilient material tube with the profiled helical inner surface includes providing or extruding a cylindrical resilient material tube, disposing the cylindrical resilient material tube on a profiled helical core, and pulling suction between the cylindrical resilient material tube and the profiled helical core to form the profiled helical inner surface.

In yet another embodiment, the step of forming the resilient material tube with the profiled helical inner surface includes providing or extruding a cylindrical resilient material tube, disposing the cylindrical resilient material tube on a profiled helical core, and providing external pressure over the cylindrical resilient material tube to form the profiled helical inner surface.

In another embodiment, the resilient material tube, with the profiled helical inner surface, is formed by molding or dip coating.

In yet another embodiment, a method of forming a resilient material lined stator includes providing an assembly of a resilient material tube with a profiled helical inner surface disposed on a core, disposing the assembly within a longitudinal bore of a body, filling a void between an outer surface of the resilient material tube and the longitudinal bore of the body with a cast material in a fluid state, allowing the cast material to solidify, and removing the core to form the resilient material lined stator.

In another embodiment, a method of forming a resilient material lined stator includes providing an assembly of a curable resilient material tube with a profiled helical inner surface disposed on a core, disposing the assembly within a longitudinal bore of a body, filling a void between an outer surface of the resilient material tube and the longitudinal bore of the body with a curable cast material, curing the cast material, and removing the core to form the resilient material lined stator. The method can further include curing, partially or fully, the curable resilient material tube before the core is removed or after the core is removed. The method can further include curing the curable resilient material tube concurrent with the curing of the cast material.

In yet another embodiment, a resilient material lined stator includes a tube with an outer surface and a profiled helical resilient material inner surface, and a cast material layer disposed between a longitudinal bore of a body and the outer surface of the resilient material tube. A resilient material lined stator can further include a conduit disposed within the cast material layer, a conductor disposed within the cast material layer, or a pathway formed within the cast material layer.

In another embodiment, a resilient material lined stator includes a resilient material tube with an outer surface and a profiled helical inner surface, and a cast material layer disposed between a longitudinal bore of a body and the outer surface of the resilient material tube. A resilient material lined stator can further include a conduit disposed within the cast material layer, a conductor disposed within the cast material layer, or a pathway formed within the cast material layer.

In yet another embodiment, a resilient material lined stator includes a resilient material tube with a profiled helical inner surface, a cast material layer surrounding or circumferential the resilient material tube, and a body with a longitudinal bore surrounding or circumferential the cast material layer. The resilient material lined stator can further include a conduit disposed within the cast material layer, a conductor disposed within the cast material layer, or a pathway formed within the cast material layer. The body of the resilient material lined stator can be tubular.

In another embodiment, a resilient material lined stator includes a resilient material tube with a profiled helical inner surface, and a cast material body surrounding or circumferential the resilient material tube. The cast material can be a resin or an epoxy. The resin or epoxy can include a solid filler, a metal filler, a polymeric fiber filler, and/or a ceramic filler.

DETAILED DESCRIPTION

A stator used in a progressive cavity apparatus typically contains a resilient material layer in the profiled helical bore to aid in sealing the cavities formed between the rotor and stator. In a preferred embodiment, and as described below, the resilient material is an elastomer. However, one skilled in the art will readily appreciate that any resilient material can be used without departing from the spirit of the invention. A resilient material can be homogenous, composite, fiber reinforced, mesh reinforced, or formed from layers of different material, which can include at least one non-resilient layer. Preferably, the inner surface of a resilient material tube is resilient; however the outer surface of a resilient material tube can be resilient or even non-resilient and still be considered a resilient material tube as used herein. A profiled helical tube can be resilient to a cylindrical shape, for example, if the profiled helical resilient material tube is formed by conforming a cylindrical resilient material tube against a profiled helical core as in FIGS. 7A-7B. A profiled helical tube can be resilient to a profiled helical shape, for example, if the profiled helical resilient material tube is fully pre-formed into a rigid profiled helical form, as illustrated in reference to FIG. 10, prior to insertion into the stator tube.

A tube, which can be a non-resilient material, having at least a profiled helical resilient material inner layer or surface, can be disposed within a longitudinal bore of a body with a cast material therebetween. In such a manner, a pre-existing stator can be retained within a longitudinal bore of another body by a cast material, and can include a conduit, a conductor, and/or a pathway extending through said cast material layer. Further, a multiple layered tube, having a profiled helical resilient material inner layer or surface, can form a stator by surrounding the circumference of said tube with a cast material. The cast material can be further disposed within a longitudinal bore of a body, which is preferably tubular.

Figure 1:
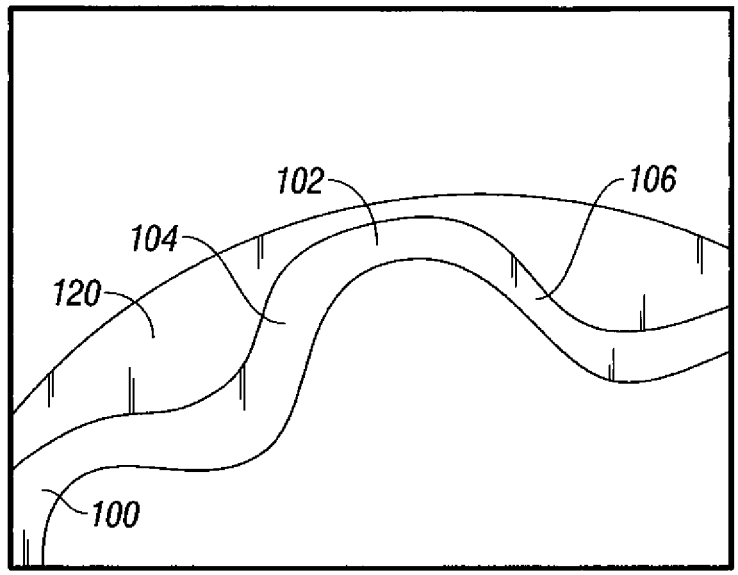
FIG. 1 is a cross-sectional view of a prior art stator with rotational misalignment between a core and the bore during elastomeric injection.
Figure 2:
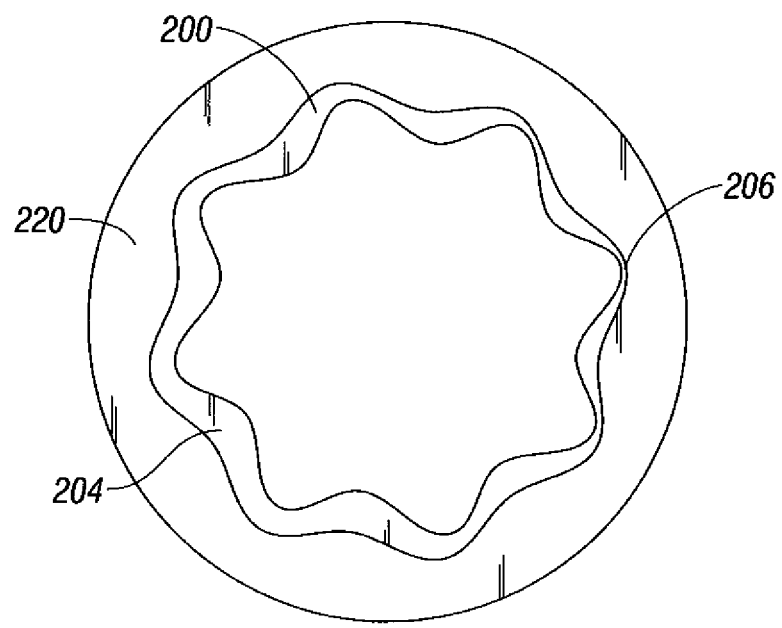
FIG. 2 is a cross-sectional view of a prior art stator with lateral misalignment between a core and the bore during elastomeric injection.

FIGS. 1-2, discussed in the background, illustrate the difficulties of controlling the desired thickness of an elastomeric layer, formed by injection, in a stator bore typically encountered in the prior art.

Figure 3:
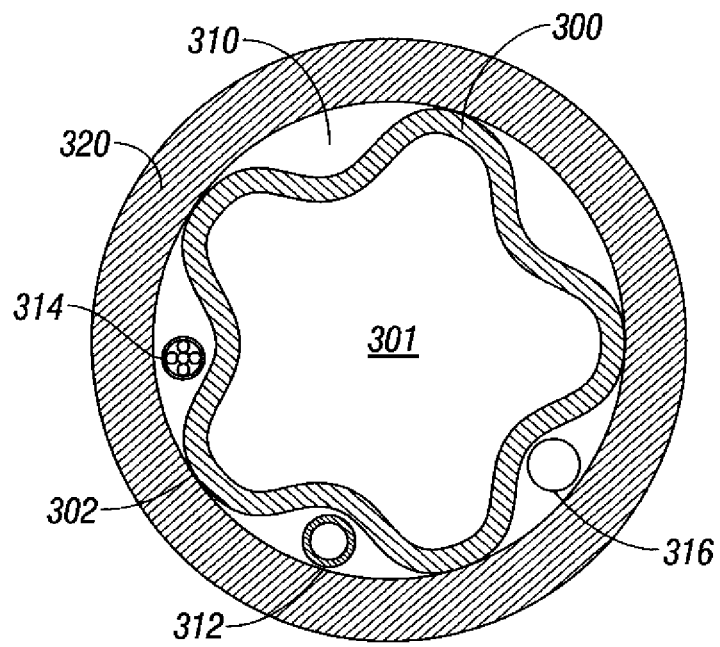
FIG. 3 is a cross-sectional view of a resilient material lined stator with an optional conduit, conductor, and pathway in the cast material layer, according to one embodiment of the invention.

FIG. 3 illustrates a cross-sectional view of one embodiment of the invention, providing a stator with a controlled thickness resilient material layer 300. As opposed to the typical method of injecting a layer of elastomer between a profiled helical bore of a stator and a profiled helical core, the current invention provides forming a controlled thickness resilient material layer 300 separate from the stator. The thickness of the resilient material layer 300 can be uniform or can be any variation desired. To form the improved resilient material lined stator illustrated in FIG. 3, a resilient material tube 300 is provided. The resilient material is typically an elastomer. As is discussed in further detail below, the resilient material tube 300 with a profiled helical inner surface can be formed by any means known in the art. The profiled helical inner surface is provided by the resilient material tube 300, and thus a profiled helical inner surface does not have to be formed in the stator body and lined with elastomer as is typical in the prior art. Furthermore, in forming an elastomeric layer by injection as in the prior art, the elastomeric layer is essentially the last component formed. The current invention allows the resilient material layer 300 to be one of the first components formed in the creation of a resilient material lined stator.

After formation, the resilient material tube 300 is then disposed within a longitudinal bore of a body 320. The body 320 can be a simple cylindrical tube, as shown in the figures, or any other shape or style of inner or outer diameter and is not limited to a tubular form. The body 320 can have a profiled helical inner and/or profiled helical outer surface or any type of complex inner geometry if so desired. The inner and outer diameter or profile of the longitudinal bore of the body 320 and the inner and outer diameter or profile of the resilient material tube 300 can independently be any size or shape provided the resilient material tube can be disposed inside the body 320.

When the body 320 and the resilient material tube 300 are in a desired position, a cast material 310 is then disposed in the void formed between the outer surface of the resilient material tube 300, which is not required to be a profiled helical outer surface, and the longitudinal bore of the body 320. Preferably, the cast material 310 is in a fluid state when disposed in the void and can be later cured with heat or the passage of time. To keep the fluid or otherwise non-fully cured cast material within the longitudinal bore of the body 320, one can seal at least a distal end of the void between the outer surface of the resilient material tube 300 and the longitudinal bore of the body 320.

The fluidic cast material 310 can conform to any shape exterior of the resilient material layer 300 to fill the entire void. The cast material 310 can be any material suitable for use with a progressive cavity apparatus. For example, the cast material 310 can be a resin or mixture of resins. One non-limiting example of a resin is the High Temperature Mould Maker (C-1) liquid epoxy by Devcon U.K., which is rated for use up to 500° F. (260° C.). The cast material 310 can be a metal filled, ceramic filled, and/or polymeric fiber filled epoxy. Non-limiting examples of metal filled epoxies are those commonly known as liquid metal and are produced by ITW Devcon in the United States and Freeman Mfg. & Supply Co. in the United Kingdom, for example. Metal fillers typically utilized are steel, aluminum, and/or titanium. One non-limiting example of a polymeric fiber filled epoxy is a polycarbon fiber ceramic filled Novolac™ resin by Protech Centreform (U.K.) Ltd. that remains stable up to 460° F. (240° C.). Metal fillers or other heat conducting materials can be added if desired to conduct heat generated in the stator bore to the outer surface of the stator tube to aid in cooling.

A cast material 310 can be curable by thermosetting, for example. Multiple concentric layers of differing or similar cast materials 310 can be utilized. The cast material 310 can be selected based on the fluid, which can include other particulate matter, for example, drill bit cuttings, used to power or be pumped by a progressive cavity apparatus. Cast material 310 can be selected based on any temperature exposure requirements, for example, the downhole fluid temperature.

If further adhesion between the resilient material tube 300 and the cast material 310 is desired, a bonding agent, for example, a primer, can be applied to the exterior surface of the resilient material tube 300 prior to insertion into the longitudinal bore of the body 320. If further adhesion between the body 320 and the cast material 310 is desired, surface roughing or a bonding agent, for example a primer, can be applied to the interior surface of the body 320 prior to the insertion therein of the resilient material tube 300. At least one groove (not shown) can be machined into the interior surface of the longitudinal bore of the body 320 to provide a mechanical lock between the body 320 and the cast material 310.

Optionally, as shown in FIG. 3, a conduit 312, conductor 314, and/or pathway 316 can be cast into the void between the body 320 and the resilient material tube 300. Although all three cast elements (312, 314, 316) are shown in FIG. 3, a single type of cast element can be present, either alone or in plurality. A conduit 312 and/or pathway 316 can be used for passing a conductor and/or fluids. A conduit 312 and/or pathway 316 can also be used as means for control and communication, for example, pressure pulses. A conductor 314, which can include an optical fiber and/or an electrical conductor, can be permanently embedded in the cast material 310. A sheathed conductor can also be embedded in the cast material 310. Although illustrated in FIG. 3 with multiple strands, a conductor 314 can be at least one strand without departing from the spirit of the invention.

A conductor, independent of the presence of an embedded conductor 314, can also be inserted into a conduit 312 or pathway 316 to allow future removal and/or refurbishment. To add a conduit 312 and/or conductor 314 to the resilient material lined stator disclosed herein, preferably a conduit 312 and/or conductor 314 is disposed in the void between the longitudinal bore of the body 320 and the outer surface of the resilient material tube 300 before the cast material 310 is added. However, the conduit 312 and/or conductor 314 can be disposed after the cast material 310 is added, but before the cast material 310 is fully cured. To aid in the bonding of the conduit 312 and/or conductor 314 to the cast material 310, a bonding agent and/or surface roughing method can be applied to the exterior surface of the conduit 312 and/or conductor 314.

A pathway 316 can also be formed in the cast material 310. As used herein, the term pathway shall refer to a passage that allows fluid to flow therethrough or allows the disposition of other objects, for example an electrical conductor, therethrough. To form a pathway 316, a tube, rod, or non-stick mandrel is disposed in the void between the outer surface of the resilient material tube 300 and the longitudinal bore of the body 320. A tube, rod, or mandrel can have a non-stick surface by material choice, for example, silicone rubber, or by applying a non-stick coating, for example, silicone gel. The tube, rod, or non-stick mandrel can then be removed after the cast material 310 is at least substantially cured to leave behind a pathway 316.

Any number of cast elements, for example, a conduit 312, a conductor 314, and/or a pathway 316, that physically fit in the void can be embedded into the cast material 310. Cast elements are not required to be evenly distributed between the lobes 302 as illustrated. Cast elements (312, 314, 316) are not required to have a straight path through the cast material 310, for example, a cast element can extend parallel to a valley between each helical lobe 302 so as to form a helical path. The alignment of a plurality of cast elements (312, 314, 316) in reference to each other, if a plurality of cast elements are present, to the longitudinal bore of the body 320, and/or the resilient material tube 300 is not critical, as they are not required to influence the thickness or shape of the resilient material layer 300.

In a preferred embodiment, a cast element, for example a conduit 312, is disposed in the void in such a manner as to create a gap between the conduit 312 and the outer surface of the resilient material tube 300. Such an arrangement can aid in the adhesion of the resilient material tube 300 to the cast material 310. In forming, a cast element can lean against the inner surface of the longitudinal bore of the body 320. A cast element (312, 314, 316) can be affixed to a shallow helical groove or other surface irregularity (not shown) in the interior surface of the body 320.

Figure 4:
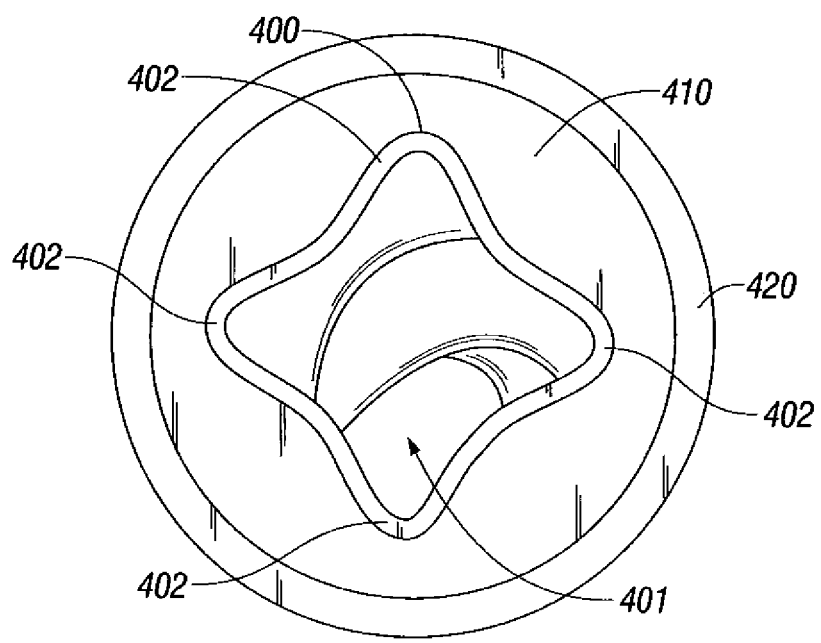
FIG. 4 is a profile view of a resilient material lined stator with an even thickness elastomer layer, according to one embodiment of the invention.

Although FIG. 3 illustrates a resilient material tube 300 with a five lobed 302 profile, a stator operating according to the Moineau principle can have as few as two lobes 302. The profile view of FIG. 4 illustrates a four lobed 402 stator and the profiled helical inner surface 401 of the resilient material tube 400. The cured cast material 410 is shown disposed between the resilient material tube 400 and the longitudinal bore of the body 420 to form a resilient material lined stator. Any protruding resilient material tube 400, cast material 410, and/or body 420 can be cut by any means known in the art to provide suitable ends of the resilient material lined stator.

Figure 5:
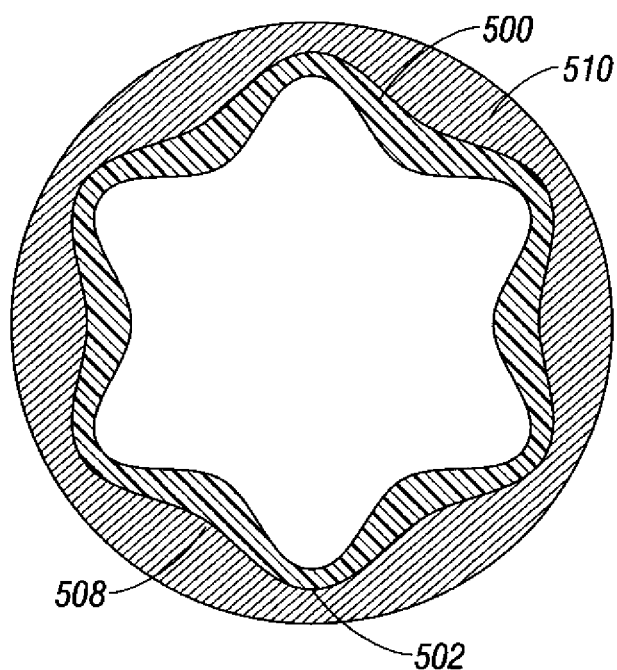
FIG. 5 is a cross-sectional view of a resilient material lined stator with a variable thickness elastomer layer and a cast material body, according to one embodiment of the invention.

While FIGS. 3-4 illustrate an even thickness resilient material layer 400, FIG. 5 illustrates that a resilient material layer 500 can have variable thickness, as is known in the art. Although a desired thickness can be variable as shown in FIG. 5, this variation is in sharp contrast to the undesired loss of control of elastomer layer thickness illustrated in prior art FIGS. 1-2. In the cross-section of the stator shown in FIG. 5, the apex 502 of each lobe of the resilient material tube 500 has a lesser wall thickness than the thickness at each valley 508. Although the thickness is shown as being equal at the apex 502 of each respective lobe and equal at each respective valley 508, the invention is not so limited.

FIG. 5 further illustrates a resilient material lined stator formed according to another embodiment of the invention. The stator is formed by disposing a cast material 510 between a resilient material tube 500 and a longitudinal bore of a body (not shown), for example, a tube or can as known in the art, and said body is removed after the cast material 510 cures. The bore of the body can be coated with a release agent or made of non-stick material, for example, polytetrafluoroethylene, to aid in the removal. The body can be made of a frangible or disposable material to aid in the removal process. The cast material 510 utilized can be chosen to be structurally sufficient to withstand the forces encountered as use a progressive cavity apparatus without the support of a body.

Although not shown in FIG. 5, a resilient material lined stator where the cast material 510 forms the outer surface of the stator without further use of a body (320 in FIG. 3) can include cast elements (312, 314, 316 in FIG. 3) such as a conduit, conductor and/or pathway even though the body can be removed before use as a stator. In a preferred embodiment, when forming a resilient material lined stator to be used without an additional body, a single cast element or plurality of cast elements can be disposed such that when the cast material 510 solidifies, the cast element is spaced from the outer surface of the resilient material tube 500 and the inner surface of the body used to form the outer surface of the cast material such that a gap is present to allow the cast material 510 to form in said gap. A cast element can also be disposed in such a manner as to create a gap between the conduit and the outer surface of the resilient material tube 500.

Figure 6:
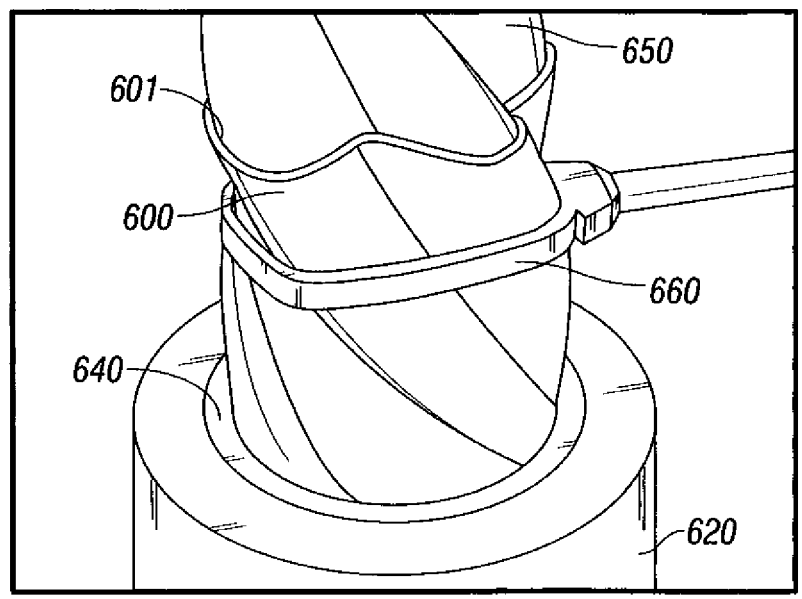
FIG. 6 is a perspective view of a resilient material tube with a profiled helical inner surface disposed on a core within a longitudinal bore of a body to form a resilient material lined stator, according to one embodiment of the invention.

Referring now to FIG. 6, although it can be desirable to have the resilient material tube 600 centered perfectly coaxial in the longitudinal bore of the body 620, it is not required. A rotor (not shown), by nature of the operation of progressive cavity apparatus, runs eccentric to the stator bore 601. The term coaxial shall refer to two bodies being concentric with each other and sharing the same axis.

However, if concentricity is desired, alignment features can be added between the resilient material layer 600 and the body 620, for example, an end ring 640. As disclosed above, the body 620 can remain in place during use as a resilient material lined stator, or the body 620 can be removed after the cast material cures such that the cast material forms the outer surface of the stator.

FIG. 6 illustrates another method of forming a resilient material lined stator using a core 650. In this embodiment, the resilient material layer 600 is disposed in the longitudinal bore of the body 620 on a core 650 or other mandrel to form the appropriately profiled helical resilient material tube 600. The core 650 has a profiled helical outer surface with a resilient material layer 600 disposed on the core 650. Depending on the type of resilient material and/or the state of the resilient material, the inner surface of the resilient material layer 600 can conform to the outer surface of the core 650. When a resilient material layer 600 that is conformed to the core 650 is utilized, the design of the outer surface of the core 650 allows for control of the design of the resilient material lined stator bore as the inner surface of the resilient material layer 600 will form said bore of the resilient material lined stator. Core 650 can have any shape or style of exterior geometry, for example a corrugated helical shape, to form the resilient material tube 600. A resilient material layer 600 can be formed on the core 650 by any means known in the art, for example dipping or otherwise forming a coating of resilient material on the core 650. Further methods of forming a resilient material layer 600 that can be used in the invention are disclosed below.

To make a resilient material lined stator with the embodiment shown in FIG. 6, a core 650 with a resilient material layer 600 is disposed within the bore of a body 620. An optional retaining device 660 can be utilized to retain the resilient material layer 600 against the profiled helical core 650 during the casting process. The cast material is then disposed in the void formed between the outer surface of the resilient material layer 600 and inner bore of the body 620.

Any curing step depends on the resilient material, cast material, and/or the present curative state of each, as well as any other concerns. The cast material can be allowed to cure prior to the final curing of the resilient material or the cast material can be cured concurrent with the curing of the resilient material as required. The curing step can include the passage of time and/or thermosetting by exposure to heat, pressure, and/or ultraviolet energy, for example. The use of the optional core 650 during the casting and/or curing process is also dependent on the materials and/or state of the materials. For example, if a resilient material layer 600 is formed by disposing a cylindrical semi-cured resilient material tube (not shown) onto a core 650, the core 650 preferably remains within the resilient material tube 600 at least until the cast material is sufficiently cured to retain the profiled helical shape due to the resiliency of the semi-cured resilient material to a cylindrical, and thus a non profiled helical, form. If the resilient material tube 600 can retain its profiled helical shape without extra support, such as in the case of using a resilient material tube that is already cured into the profiled helical form, the use of the core 650 becomes optional for the casting and/or curing process.

Additionally, if further curing of the resilient material and/or the cast material is desired, the complete assembly can be placed inside an apparatus for curing. To ease removal of the core 650, it can be desirable to remove the core 650 prior to curing of the resilient material, but after the cast material has cured. If the type of resilient material being used can deform during the curing process if not properly constrained, a lubricating release agent, for example, silicone gel, can be applied to the outer surface of the core 650, which is then reinserted into the bore of the resilient material tube 600.

After curing of the resilient material, if a semi-cured or otherwise non-cured resilient material tube is used, the core 650 can then be permanently removed. The ends of the fully cured stator assembly can then be cleaned up to form the finished thin walled stator with a well-controlled resilient material wall thickness.

A resilient material tube can be formed through any means known in the art. One method of forming a resilient material tube 600 is to first form a cylindrical tube, for example, by molding or extrusion. Extrusion allows substantially any length of tubing to be formed. If an even thickness of resilient material is desired, a wall thickness variation of +/−0.5 mm is commonly obtainable through precision class extrusion. Using a cylindrical tube with an even thickness of resilient material can allow the wall thickness of the profiled helical resilient material tube to be of substantially the same thickness as that of the cylindrical tube. A variable thickness resilient material tube can also be utilized without departing from the spirit of the invention. The inner diameter of the cylindrical tube can be sized relative to the outer diameter of an optional core used to produce the desired helical profiled bore. The inner diameter can be selected so as to allow minimal stretching or bulging of the profiled helical resilient material tube 600 formed by conforming the cylindrical tube to the profiled helical core 650. The core 650 typically will have an external geometry that mirrors that of the profiled helical bore of the desired stator.

Figure 7A:
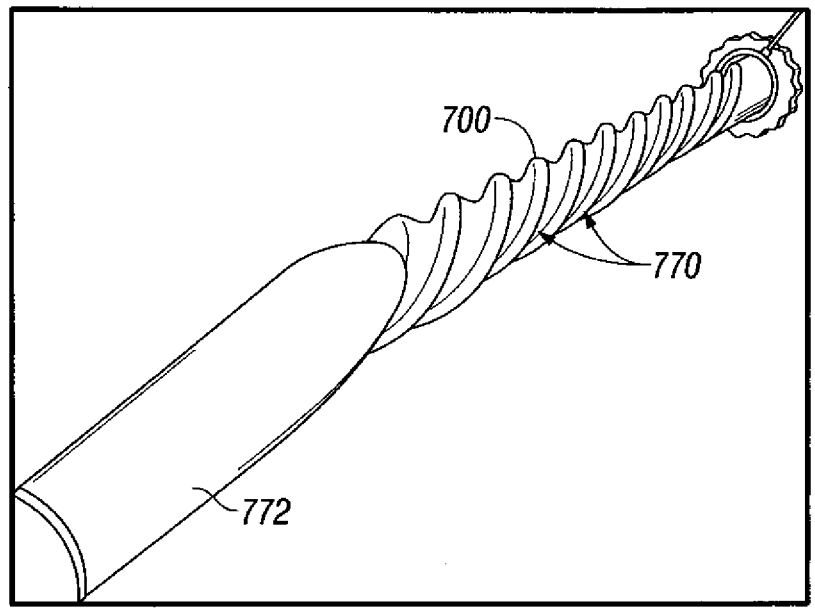
FIG. 7A is a perspective view of a resilient material tube with a profiled helical inner surface, according to one embodiment of the invention.
Figure 7B:
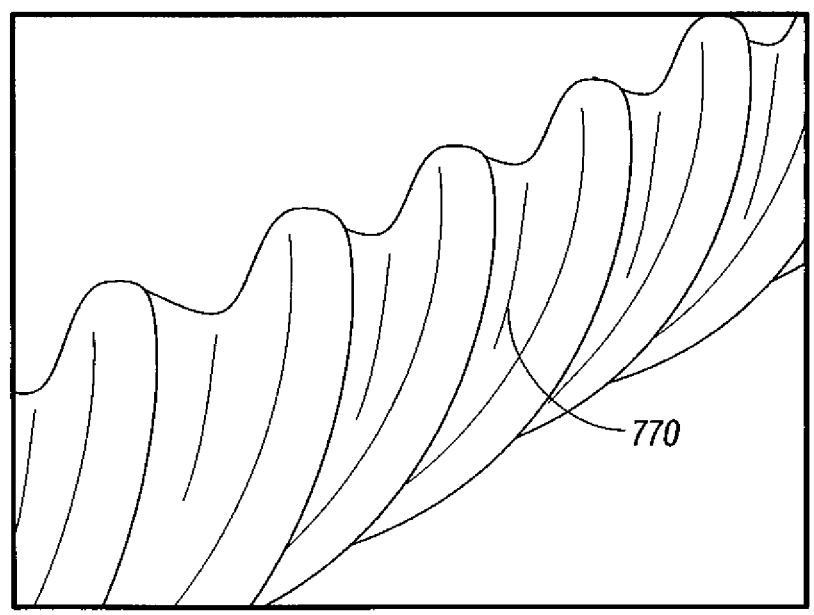
FIG. 7B is a close-up perspective view of the resilient material tube with a profiled helical inner surface of FIG. 7A.

Referring now to FIG. 7A, a resilient material tube 700 is disposed on a core. The proximal end of the resilient material tube 700 is a cylindrical tube 772 that has not been formed into the desired profiled helical shape 770. FIG. 7B is a close-up view of a section of the cylindrical tube 772 that has been formed into a profiled helical tube 770 with the core. Although the resilient material tube 700 is shown with a profiled helical outer surface, the invention is not so limited, as the inner surface of the resilient material tube 700 forms the stator bore.

Figure 8:
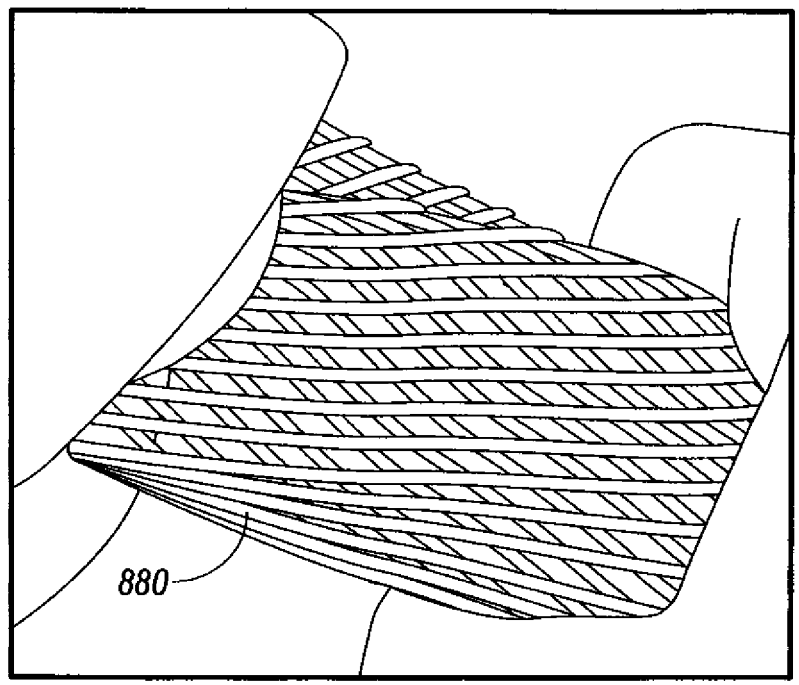
FIG. 8 is a perspective view of the formation of a resilient material tube with a profiled helical inner surface as illustrated with a mesh tube, according to one embodiment of the invention.

One method of forming a cylindrical resilient material tube into a profiled helical resilient material tube is by disposing the cylindrical tube over a core that has a profiled helical outer surface that mirrors the desired stator bore and then twisting the resilient material tube onto the core, for example, as illustrated with a mesh tube 880 in FIG. 8. This twisting can be through automatic or manual means. The mesh tube 880 is used as a demonstration part to provide visualization on how a flexible cylindrical tube deforms when twisted over a profiled helical core.

Another method of forming a cylindrical resilient material tube into a profiled helical resilient material tube is by disposing the cylindrical tube over a core and pulling suction between the core and the inner surface of the cylindrical resilient material tube. Similarly, pressure can be applied to the external surface of the cylindrical resilient material tube to aid in conforming the cylindrical tube to the profiled helical core in conjunction with the suction process or alone. Twisting the cylindrical tube, for example, as shown with a mesh tube 880, during the suction and/or pressurization process can aid in the formation of the profiled helical resilient material tube. As a result of any of these processes, the cylindrical resilient material tube now has a bore shaped substantially similar to the outer surface of the core. However, the process above is illustrative, and a profiled helical inner surface of a resilient material tube can be formed through any means known in the art.

Regardless of the method used to create a resilient material tube with a profiled helical inner surface, the state of the resilient material used can determine if the resilient material must be cured, in addition to or concurrent with any desired curing of the cast material.

For example, a previously semi-cured resilient material can be used in the casting step as it is generally easier to form around the core due to minimal resiliency or spring-back of the material. However, this can necessitate curing the resilient material after the cast material has solidified. The additional curing process can aid in relieving any stress built up in the cast material during the curing of the cast material. As discussed above, an optional core can be utilized during the resilient material curing process if so desired.

A fully cured resilient material, or a resilient material that does not require curing, can also be used to form the resilient material tube. Materials that do not require further curing or are fully cured are generally harder to form into the profiled helical shape as they have a high resiliency when not mechanically secured around or to the core. In such cases, a mechanical lock, for example, a tie-wrap around the resilient material tube and core or an adhesive affixing the ends of the resilient material tube to the core, can be utilized to retain the profiled helical shape. The mechanical lock and/or adhesive can be removed after the cast material has solidified as the cast material is preferably bonded to the resilient material tube.

A resilient material tube can also be created by forming a profiled tube into a helical pattern. The term profiled shall refer to a non-circular cross sectional, for example, the corrugated profile shown in FIG. 5. A profiled tube can be formed through extrusion. A profiled tube can be of even or variable wall thickness. Cross-sectional shapes, even those which are high complex, can be extruded. The profiled non-helical tube can be formed into a helical pattern by any means known the art, for example, by using a profiled helical core as disclosed above.

Creating a profiled helical tube using non-rotating and rotating profile dies with a straight extrusion gap as well as using a hollow die with a helical extrusion gap have been disclosed in SLB Pat. App. SLB-10/92.1101, incorporated by reference herein. A resilient material tube with a profiled inner surface can be formed by extruding an elastomer through a profile die, for example a hollow die, to form the profiled resilient material tube. To impart the helical pattern to the profiled resilient material tube, the profile die can be rotated during extrusion at a rate which can depend on the extrusion rate and/or the pitch length of the helical form desired.

Figure 9A:
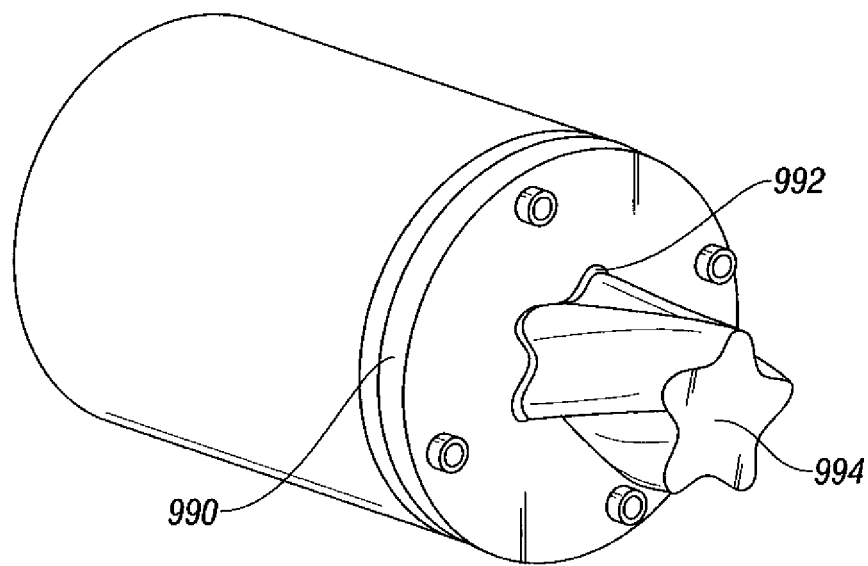
FIG. 9A is a perspective view of a hollow die with a helical extrusion gap for forming a resilient material tube with a profiled helical inner surface, according to one embodiment of the invention.
Figure 9B:
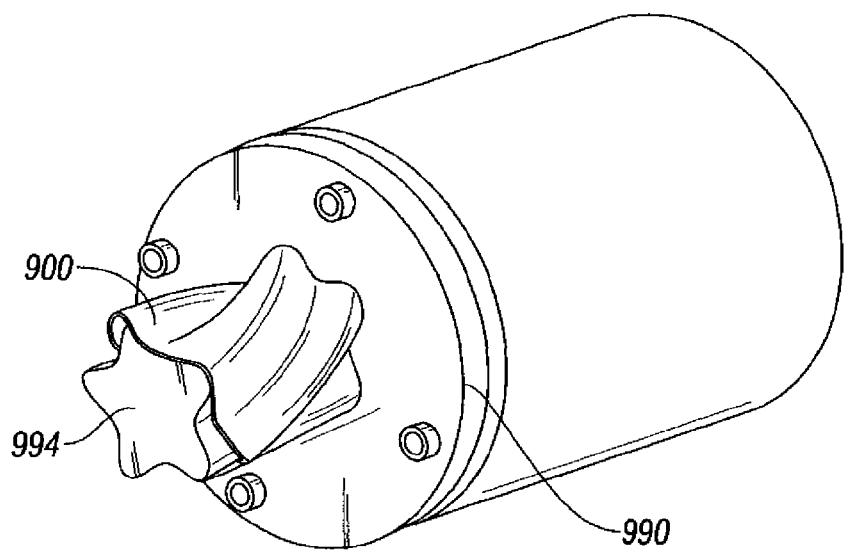
FIG. 9B is a perspective view of the hollow die of FIG. 9A extruding a resilient material tube with a profiled helical inner surface.

Referring now to FIGS. 9A-9B, an apparatus 990 for extruding a helical profiled tube 900 is illustrated. In use, a resilient material tube 900 with a profiled helical inner and profiled helical outer surface is formed by extruding an extrudable material, typically an elastomer, through the helical extrusion gap 992 formed between the die cap or hollow plate 990 and the profiled helical mandrel 994. Optionally, the profiled helical mandrel or inner core 994 can extend beyond the point of extrusion, as shown in FIGS. 9A-9B, which can aid in support of the extruded resilient material tube 900 during formation.

Figure 10:
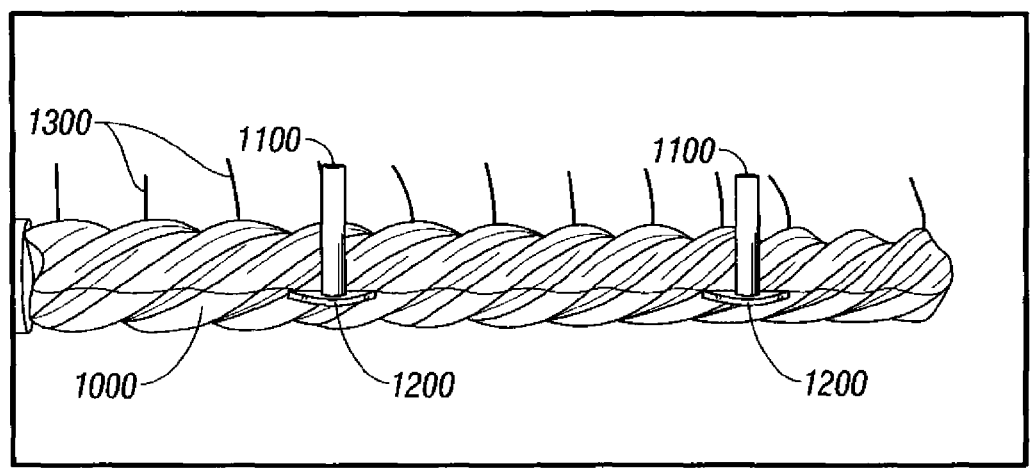
FIG. 10 is a perspective view of a resilient material tube with a profiled helical inner surface formed by molding, according to one embodiment of the invention.

Referring now to FIG. 10, a resilient material tube 1000 with a profiled helical inner surface can be formed by molding, for example, by transfer molding or injection molding. The profiled helical inner surface of the resilient material tube 1000 will form the sealing or running surface against the rotor. Any minor join line, flash, gate 1100, runner 1200, and/or air vent 1300 left on the exterior surface of the resilient material tube by the mold is acceptable. The exterior surface can be trimmed, even roughly, to remove obvious extrusions, or left as a feature to form an interlock with the cast material. Dip coating, typically including dipping a profiled helical core with a non-stick outer surface (not shown) into a fluidic elastomer, is another method of producing a resilient material tube with a profiled helical inner surface. Slight running of the elastomer on the exterior surface of the formed resilient material tube is acceptable as the exterior surface of the resilient material tube can function as a bonding surface for the cast material.

Any other technique that produces a profiled helical inner surface in a resilient material tube can be utilized. The outer surface of the resilient material tube need not be profiled and/or helical. The quality and/or dimensions of the outer surface can have a greater allowable variation than those of the inner surface. The outer surface typically functions as a bonding surface to the cast material, not a rotor sealing surface as does the inner surface of the resilient material tube. Regardless of the process used to form a resilient material tube with a profiled helical inner surface, a resilient material lined stator can be formed by disposing the resilient material tube into a bore of a body and disposing a cast material into the void therebetween.

Numerous embodiments and alternatives thereof have been disclosed. While the above disclosure includes the best mode belief in carrying out the invention as contemplated by the named inventors, not all possible alternatives have been disclosed. For that reason, the scope and limitation of the present invention is not to be restricted to the above disclosure, but is instead to be defined and construed by the appended claims.

What is claimed is:

1. A method of forming a resilient material lined stator comprising:
   forming a resilient material tube with a profiled helical inner surface and a variable thickness;
   disposing the resilient material tube within a longitudinal bore of a body;
   filling a void between an outer surface of the resilient material tube and the longitudinal bore of the body with a cast material in a fluid state; and
   allowing the cast material to solidify.

2. The method of claim 1 wherein forming the resilient material lined stator comprises sintering or hot isostatic pressing of powdered metal.

3. The method of claim 1 wherein the resilient material tube with the profiled helical inner surface is formed by molding.

4. The method of claim 1 wherein forming comprises forming the resilient material tube so the profiled helical inner surface comprises in cross-section a plurality of apexes and a plurality of valleys.

5. The method of claim 4 wherein forming comprises forming each apex of the plurality of apexes with a lesser wall thickness than the thickness at each valley of the plurality of valleys.

* * * * *